United States Patent [19]
Koshi et al.

[11] Patent Number: 5,701,367
[45] Date of Patent: Dec. 23, 1997

[54] IMAGE DATA CODING SYSTEM FOR CONTROLLING AMOUNTS OF CODE DATA FOR CHARACTER IMAGE AND NATURAL IMAGE REGIONS

[75] Inventors: Yutaka Koshi; Shunichi Kimura; Koh Kamizawa, all of Kanagawa, Japan

[73] Assignee: Fuji Xerox Co., LTD., Tokyo, Japan

[21] Appl. No.: 325,144

[22] Filed: Oct. 20, 1994

[30] Foreign Application Priority Data

Oct. 26, 1993 [JP] Japan ................... 5-267635

[51] Int. Cl.⁶ ................... G06K 9/36; G06K 9/46
[52] U.S. Cl. ................... 382/239; 382/243; 382/232; 348/397; 348/400
[58] Field of Search ................... 382/232–235, 382/237, 239, 240, 243, 246, 266; 358/262.1, 429, 432, 433; 348/397, 398, 400, 403

[56] References Cited

U.S. PATENT DOCUMENTS

| | | | |
|---|---|---|---|
| 4,791,486 | 12/1988 | Spriggs et al. | 348/399 |
| 5,040,233 | 8/1991 | Davy et al. | 382/239 |
| 5,315,670 | 5/1994 | Shapiro | 382/240 |
| 5,422,963 | 6/1995 | Chen et al. | 382/232 |
| 5,432,891 | 7/1995 | Onodera | 395/114 |
| 5,502,778 | 3/1996 | Ishikawa et al. | 382/239 |
| 5,539,842 | 7/1996 | Schwartz | 382/232 |

OTHER PUBLICATIONS

S. Katsuno et al., "Efficient Hybrid Coding Scheme for Color Facsimile," The Technical Report of the IEICE, 1991, CS 91–96, pp. 13–20.

K. Nemoto, et al., "Bit–Rate Control Method for DCT Image Coding," Proceedings of the 1989 IEICE Fall Conference, 1989, D–45.

*Primary Examiner*—Leo Boudreau
*Assistant Examiner*—Bipin Shalwala
*Attorney, Agent, or Firm*—Finnegan, Henderson, Farabow, Garrett & Dunner, L.L.P.

[57] ABSTRACT

An image coding device capable of securely controlling a total code amount to a fixed amount in coding image data including a character image region and a natural image region mixed together. The image coding device includes a first circuit for extracting a character image region having a variable size from input image data; a second circuit for controlling a code amount of image data of the character image region; a third circuit for multivaluing image data of the character image region extracted by the first circuit; a fourth circuit for reversible coding image data of the character image region multivalued by the third circuit; a fifth circuit for subtracting the image data of the character image region from the input image data to generate image data of a natural image region; and a sixth circuit for non-reversible coding the image data of the natural image region generated from the fifth circuit; wherein the size of the character image region to be extracted by the first circuit is controlled by the second circuit so that the code amount of the image data of the character image region becomes a first preset target code amount, and the image data of the natural image region is coded by the sixth circuit so that a code amount of the image data of the natural image region becomes a second preset target code amount.

4 Claims, 12 Drawing Sheets

1

IMAGE DATA CODING SYSTEM FOR CONTROLLING AMOUNTS OF CODE DATA FOR CHARACTER IMAGE AND NATURAL IMAGE REGIONS

BACKGROUND OF THE INVENTION

1. Field of the Invention

The present invention relates to a device for digitizing an image and coding the image digitized.

2. Description of the Related Art

In a digital image storing device, for example, an image including a character image and a natural image mixed together is digitized, and digital data thus obtained is coded so that a code data amount is controlled to become a certain amount. Then, code data thus obtained is stored into a memory.

Some conventional image coding systems will now be described.

1. JPEG System

As an image coding system, there is a JPEG base line coding system (which will be hereinafter referred to as a JPEG system) having been examined for international standardization in JPEG (Joint Photographic Expert Group) which is a joint of ISO and CCITT.

The JPEG system is a system for suppressing redundancy of image data by using the property of an image, which is a non-reversible coding system. In the JPEG system, digitized input image data is subjected to discrete cosine transform, and a transform coefficient generated as the result of this transform is quantized. Then, a quantization index as the result of this quantization is coded by entropy coding.

In general, a natural image has low spatial frequency components large in power and high spatial frequency components small in power. Accordingly, a deterioration in decoded image quality can be reduced by finely quantizing a low spatial frequency region of the transform coefficient and coarsely quantizing a high spatial frequency region of the transform coefficient.

However, a character image contains high spatial frequency components more than those of the natural image. Accordingly, a decoded image quality is deteriorated by a quantization error in the high spatial frequency region.

2. JPEG/JBIG Hybrid Coding

To improve the above problem, there has been proposed an image coding system constructed by combining a non-reversible coding system and a reversible coding system. In this image coding system, a natural image is coded by the non-reversible coding system and a character image is coded by the reversible coding system. For example, such a combined coding system is described in "Efficient Hybrid Coding Scheme for Color Facsimile," Technical Report of the IEICE, CS 91-96, 1991 (such a combined coding system will be hereinafter referred to as a hybrid coding system).

In the hybrid coding system, a character image region is extracted from an image including a character image and a natural image mixed together. The character image region thus extracted is binarized, and the binarized character image region is then coded by a JBIG (Joint Bi-level Coding Expert Group) system as the reversible coding system. On the other hand, an image or a natural image region obtained by subtracting the character image region from the original image is coded by the JPEG system.

In general, a character image is a binary image composed of a character color and a background color. Accordingly, a deterioration in image quality due to binarizing is small. That is, a deterioration in decoded image quality in reversible coding a character image as a binary image is smaller than that in non-reversible coding a character image as a multivalued image mentioned above.

In the hybrid coding system, however, a code data amount changes depending upon an image. Accordingly, the coding cannot be performed with the code data amount always fixed without depending upon an image.

3. JPEG Code Amount Control System

To solve the above problem, there has been proposed a system of performing code amount control in the non-reversible coding system. For example, such a system is described in "Bit-Rate Control Method for DCT Image Coding," Proceedings of the 1989 IEICE Fall Conference, D-45, 1989.

The code amount control method described in the above literature will be hereinafter referred to as a code amount control DCT (Discrete Cosine Transform) system for convenience. In this code amount control DCT system, the relation between a code amount and a transform coefficient quantization step as a parameter having an influence upon the code amount is preliminarily examined. Then, the code amount is controlled by using this relation. In general, when the value of the transform coefficient quantization step is increased, the code amount is decreased to cause a reduction in decoded image quality, whereas when the value of the transform coefficient quantization step is decreased, the code amount is increased to improve the decoded image quality.

The configuration of the code amount control DCT system will now be described with reference to FIG. 13. This system is composed of blocking means 300 for dividing a sampled image into a plurality of blocks each consisting of 8×8 pixels, discrete cosine transform means 301 for performing discrete cosine transform to a pixel value in each block, transform coefficient storing means 302 for temporarily storing a transform coefficient 308 generated from the means 301, quantization means 303 for quantizing a transform coefficient 309 generated from the means 302 with a given quantization step, variable length coding means 304 for performing variable length coding to a quantization index 310 generated from the means 303, and measuring/estimating means 305 for measuring a code data amount 311 in the means 304 and estimating a quantization step as a preset code amount according to a result of measurement.

The operation of this system will now be described with reference to FIG. 13. Image data 306 is sampled. In the blocking means 300, the sampled image data 306 is divided into a plurality of blocks 307 each consisting of m×m pixels (m: positive integer). In the discrete cosine transform means 301, the pixel value in each pixel block 307 is subjected to discrete cosine transform. In the transform coefficient storing means 302, the transform coefficient 308 generated from the means 301 is temporarily stored. In the quantization means 303, the transform coefficient 309 generated from the means 302 is quantized with a given quantization step. In the variable length coding means 304, the quantization index 310 generated from the means 303 is subjected to variable length coding. At this time, in the measuring/estimating means 305, the code data amount 311 is measured and a quantization step as a preset code amount is estimated according to the result of measurement. This quantization step corresponds to a quantization matrix 312. Then, the transform coefficient 309 stored in the transform coefficient storing means 302 is quantized again with the estimated quantization step in the quantization means 303, and is coded again in the variable length coding means 304 to generate code data 313.

Such a series of operation consisting of the quantization, the variable length coding, and the measurement/estimation is repeated until the preset code amount is reached. Thus, the description of the operation of the code amount control DCT system has been completed.

Accordingly, the code amount in a natural image region can be controlled by using the above-mentioned code amount control DCT system for the coding of the natural image region in the hybrid coding system. However, the code amount in a character image region cannot be controlled because it is univocally decided depending upon the statistic property of an image in the character image region.

4. Code Amount Control for Hybrid Coding

The above problem may be solved by a system of allocating to the natural image region the remainder obtained by subtracting the code amount in the character image region from a target code amount.

The configuration of this system will now be described with reference to FIG. 14. This system is composed of character image region extracting means 201 for extracting a character image region 209 from input image data 208, natural image region extracting means 205 for subtracting the character image region 209 from the input image data 208 to generate a natural image region 212, binarizing means 202 for binarizing the character image region 209 extracted, reversible coding means 204 for reversible coding a character image region 210 binarized, code amount allocating means 203 for counting a code amount of the character image region 209, subtracting the code amount of the character image region 209 from a preset target code amount, and calculating a code amount to be allocated to the natural image region 212, code amount control non-reversible coding means 206 for non-reversible coding the natural image region 212 as controlling the code amount to the allocated code amount, and multiplexing means 207 for synthesizing character image region code data 211 generated from the reversible coding means 204 and natural image region code data 214 generated from the non-reversible coding means 206.

The operation of this system will now be described with reference to FIG. 14. In the character image region extracting means 201, the character image region 209 is extracted from the input image data 208. In the natural image region extracting means 205, the character image region 209 is subtracted from the input image data 208 to generate the natural image region 212. The character image region 209 is binarized in the binarizing means 202, and the binarized character image region 210 is coded in the reversible coding means 204. In the code amount allocating means 203, the code amount in the character image region 209 is counted, and it is subtracted from the preset target code amount to allocate the remainder of subtraction to the natural image region 212. In the non-reversible coding means 206, the natural image region 212 is coded so that the code amount is controlled to the allocated code amount. The character image region code data 211 from the reversible coding means 204 and the natural image region code data 214 from the non-reversible coding means 206 are synthesized in the multiplexing means 207 to generate code data 215. As the result, the sum of the code amount of the character image region code data 211 and the code amount of the character image region code data 214 is controlled to a constant amount, or the target code amount. Thus, the description of the code amount control for the hybrid coding has been completed.

According to the code amount control for the hybrid coding mentioned above, the total code amount can be basically controlled to a constant amount in coding image data including a character image region and a natural image region mixed together.

However, the code amount control for the hybrid coding still has the following disadvantages.

1. The code amount in the character image region cannot be controlled with the result that the target code amount is not surely attainable. For example, there is a possibility that the code amount in the character image region may become larger than the target code amount.

2. When the code amount in the character image region becomes larger than the target code amount, the natural image region and a part of the character image region cannot be decoded by the use of only the target code amount of code data.

SUMMARY OF THE INVENTION

It is accordingly an object of the present invention to provide an image coding device which can securely control a total code amount to a fixed amount in coding image data including a character image region and a natural image region mixed together.

According to the present invention, there is provided an image coding device comprising first means for extracting a character image region having a variable size from input image data; second means for controlling a code amount of image data of the character image region; third means for multivaluing image data of the character image region extracted by the first means; fourth means for reversible coding image data of the character image region multivalued by the third means; fifth means for subtracting the image data of the character image region from the input image data to generate image data of a natural image region; and sixth means for non-reversible coding the image data of the natural image region generated from the fifth means; wherein the size of the character image region to be extracted by the first means is controlled by the second means so that the code amount of the image data of the character image region becomes a first preset target code amount, and the image data of the natural image region is coded by the sixth means so that a code amount of the image data of the natural image region becomes a second preset target code amount.

FIG. 1 shows a conceptual block diagram of the image coding device according to the present invention.

Referring to FIG. 1, the image coding device according to the present invention includes character image region extracting means 1 for extracting a character image region from input image data, the size of the character image region being variable; character image region code amount control means 2 for controlling a code amount of image data in the character image region; multivaluing means 3 for multivaluing the image data in the character image region extracted; reversible coding means 4 for reversible coding the multivalued image data in the character image region; natural image region extracting means 5 for subtracting the image data in the character image region from the input image data to generate image data in a natural image region; code amount control non-reversible coding means 6 for non-reversible coding the image data in the natural image region so that a code amount of the image data in the natural image region becomes a preset target code amount; and multiplexing means 7 for synthesizing an output from the reversible coding means 4 and an output from the code amount control non-reversible coding means 6, wherein the size of the character image region to be extracted is controlled .so that the code amount of the image data in the character image region becomes a preset target code amount, and the image data in the natural image region is coded so that the code amount becomes the preset target code amount, with the result that the sum of the code amount of the image data in the character image region and the code amount of the image data in the natural image region becomes a preset target code amount of the whole image.

As shown in FIG. 2, the character image region code amount control means 2 for controlling the code amount of the image data in the character image region includes code amount estimating means 21 for measuring the entropy of a coding symbol 11 output from the reversible coding means 4 and estimating the code amount on the assumption that the code amount is a function of entropy, and parameter setting means 22 for setting a parameter for varying the size of the character image region, wherein when the estimated code amount is larger than the target code amount, the parameter is set so that the region to be extracted becomes small, whereas when the estimated code amount is smaller than the target code amount, the parameter is set so that the region to be extracted becomes large.

As shown in FIG. 3, the character image region extracting means 1 for extracting the character image region having a variable size includes feature amount calculating means 31 for calculating a feature amount of the image, character image region determining means 32 for determining the character image region according to the criterion for the feature amount, that is, according to the parameter, and image region extracting means 33 for extracting the image region according to the result of determination, whereby the size of the region to be extracted is varied by varying the parameter.

As the feature amount of the image, an amount corresponding to the intensity of an edge may be used. For example, a moment operator as described in Takagi et al. ed. "Image Analysis Handbook", Tokyo University Press, pp 550–pp 560 may be used to detect an edge from a position of the center of gravity in a local region of the image.

The operation will now be described with reference to FIGS. 1, 2, and 3.

Firstly, the operation until first extracting the character image region will be described. In the feature amount calculating means 31, a feature amount 34 corresponding to the intensity of an edge is calculated from input image data 8. In the character image region determining means 32, the character image region is determined according to the feature amount 34 on the basis of a preset initial parameter (character image region extraction parameter) 12 as the criterion to output a determination result 35. In the image region extracting means 33, a character image region 9 is extracted from the input image data 8 according to the determination result 35. The image data in the character image region 9 extracted is multivalued in the multivaluing means 3. In the following description, the multivaluing or the coding of image data in a certain region will be referred to simply as the multivaluing or the coding of such a region. Further, the multivaluing implies two- or more-valuing. Thus, the extraction of the initial character image region is ended.

Secondly, the operation of code amount control of the character image region will be described. A multivalued character image region 10 is converted into the coding symbol 11 in the reversible coding means 4. In case of usual reversible coding, the coding symbol 11 is entropy coded. However, in case of the code amount control, the coding symbol 11 need not be entropy coded. In the code amount estimating means 21 of the character image region code amount control means 2 shown in FIG. 2, the entropy of the coding symbol 11 is calculated and an estimated code amount 23 in the character image region is calculated on the assumption that the code amount is a function of entropy. In the parameter setting means 22, the estimated code amount 23 and the preset target code amount are compared. When the estimated code amount 23 is larger than the target code amount, the parameter 12 is set so that the region to be extracted becomes small, whereas when the estimated code amount 23 is smaller than the target code amount, the parameter 12 is set so that the region to be extracted becomes large. Specifically, the parameter 12 is set to a threshold indicating the intensity of an edge. Then, according to the parameter 12 newly set above, a new character image region 9 is extracted in the character image region extracting means 1, and the character image region 9 is multivalued in the multivaluing means 3. A series of such operation consisting of the extraction of the character image region, the multivaluing, the conversion to the coding symbol, and the estimation of the code amount and the setting of the parameter is repeated until the estimated code amount 23 approaches the preset target code amount. Thus, the description of the code amount control of the character image region has been completed.

After the estimated code amount in the character image region has reached the target code amount, a final multivalued character image region 10 is reversible coded in the reversible coding means 4 to generate code data 13.

On the other hand, in the natural image region extracting means 5, the final character image region 9 is subtracted from the input image data 8 to generate a natural image region 14. In the code amount control non-reversible coding means 6, the natural image region 14 is non-reversible coded so that the code amount is controlled to the preset target code amount in the natural image region to generate code data 15.

The code data 13 of the character image region and the code data 15 of the natural image region are multiplexed by the multiplexing means 7 to generate code data 16.

As described above, the present invention can exhibit the following effects.

1. The code amount in the character image region can be controlled to the preset target code amount. Accordingly, in a reversible/non-reversible hybrid coding device, the code amount control for the character image region and the code amount control for the natural image region can be combined to thereby achieve the code amount control for an image including a character image and a natural image mixed together.

2. There does not arise any disadvantages such that a natural image or a character image cannot be partially decoded because of incapability of attaining a target code amount.

Other objects and features of the invention will be more fully understood from the following detailed description and appended claims when taken with the accompanying drawings.

DETAILED DESCRIPTION OF THE PREFERRED EMBODIMENTS

Figure 1:
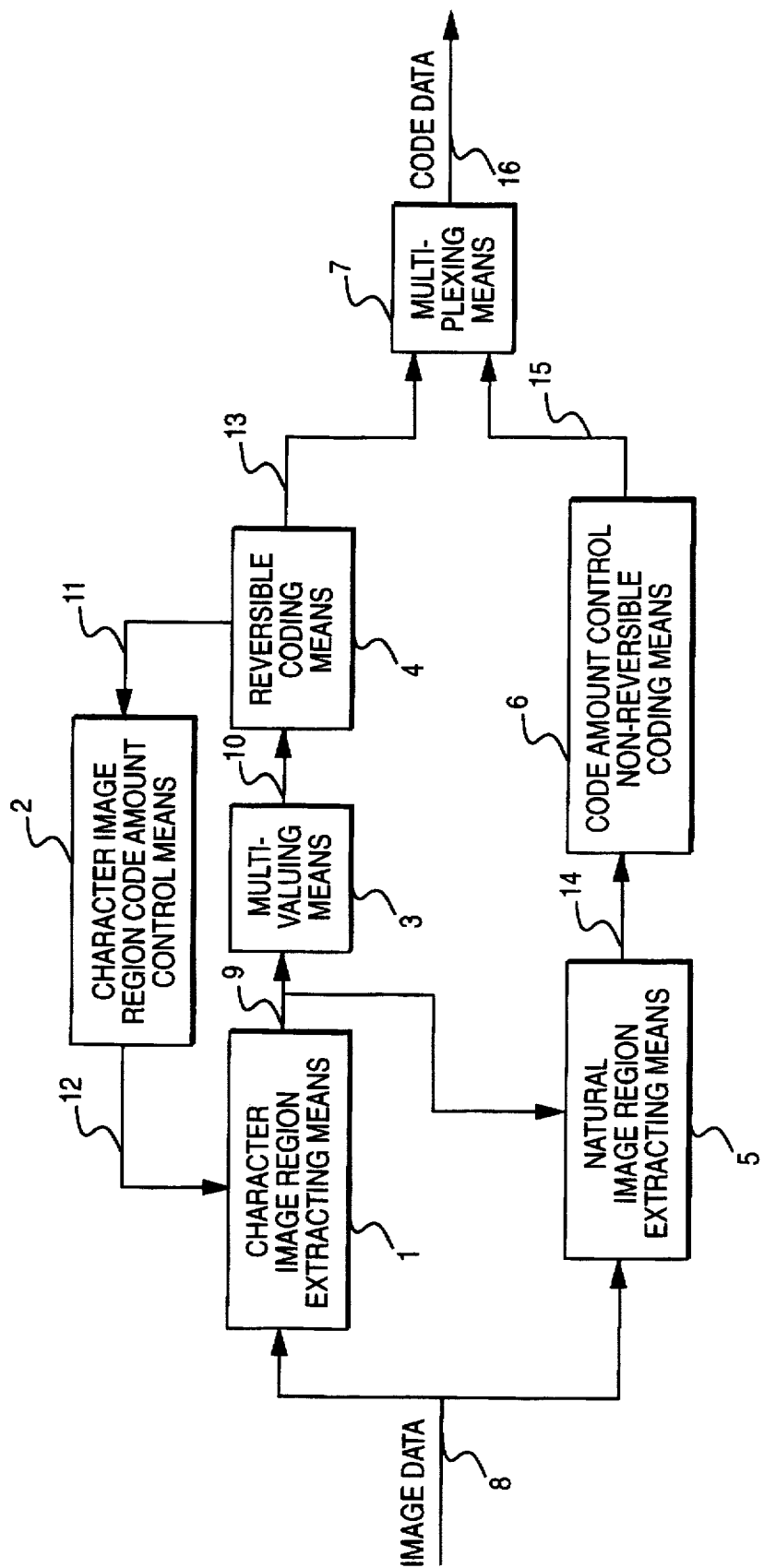
FIG. 1 is a block diagram of the present invention.
Figure 2:
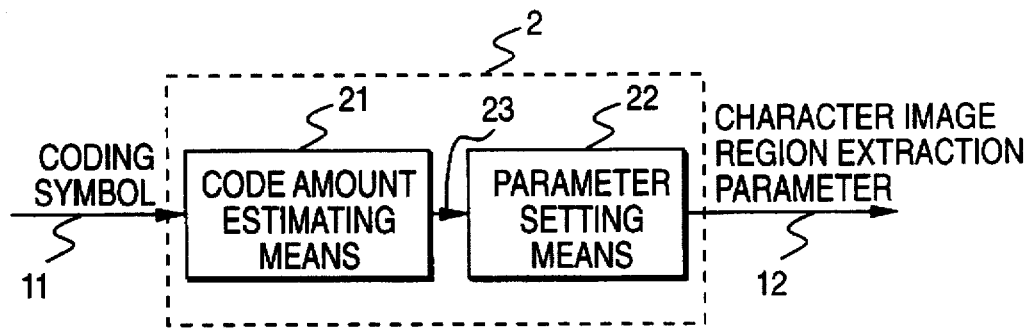
FIG. 2 is a block diagram of the character image region code amount control means in the present invention.
Figure 3:
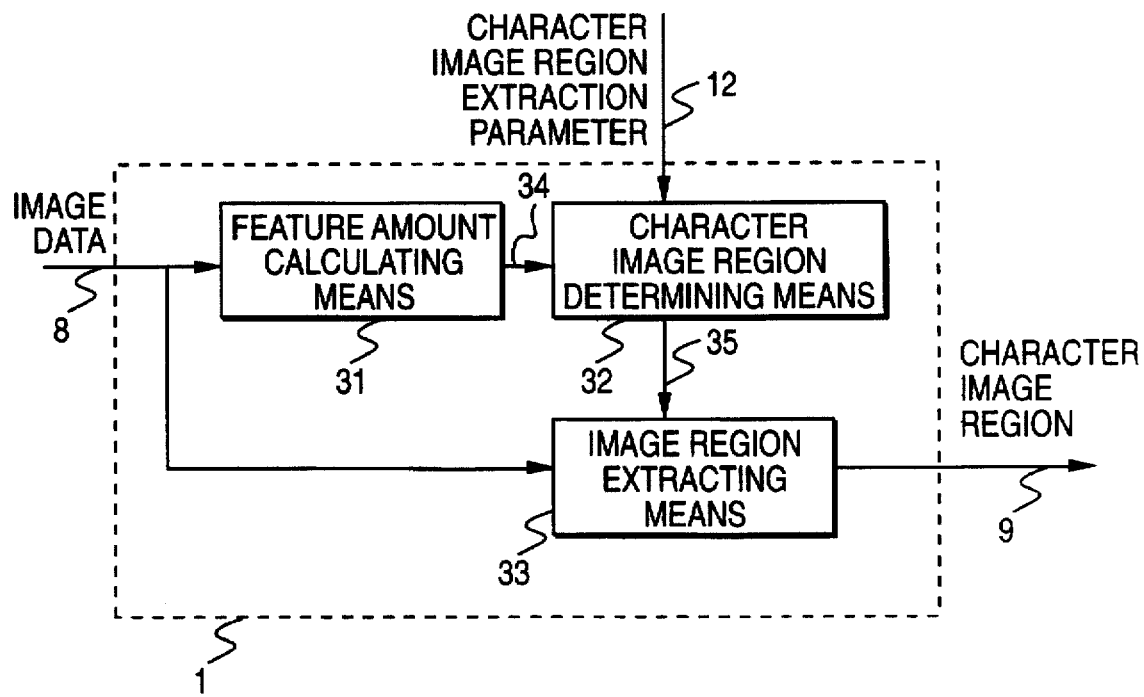
FIG. 3 is a block diagram of the character image region extracting means in the present invention.

The general configuration of a preferred embodiment of the present invention will now be described with reference to FIGS. 4 to 6. Each circuit shown in FIG. 4 and each means shown in FIG. 1 are in one-to-one correspondence. Similarly, each circuit shown in FIG. 5 and each means shown in FIG. 2 are in one-to-one correspondence, and each circuit shown in FIG. 6 and each means shown in FIG. 3 are in one-to-one correspondence.

Figure 4:
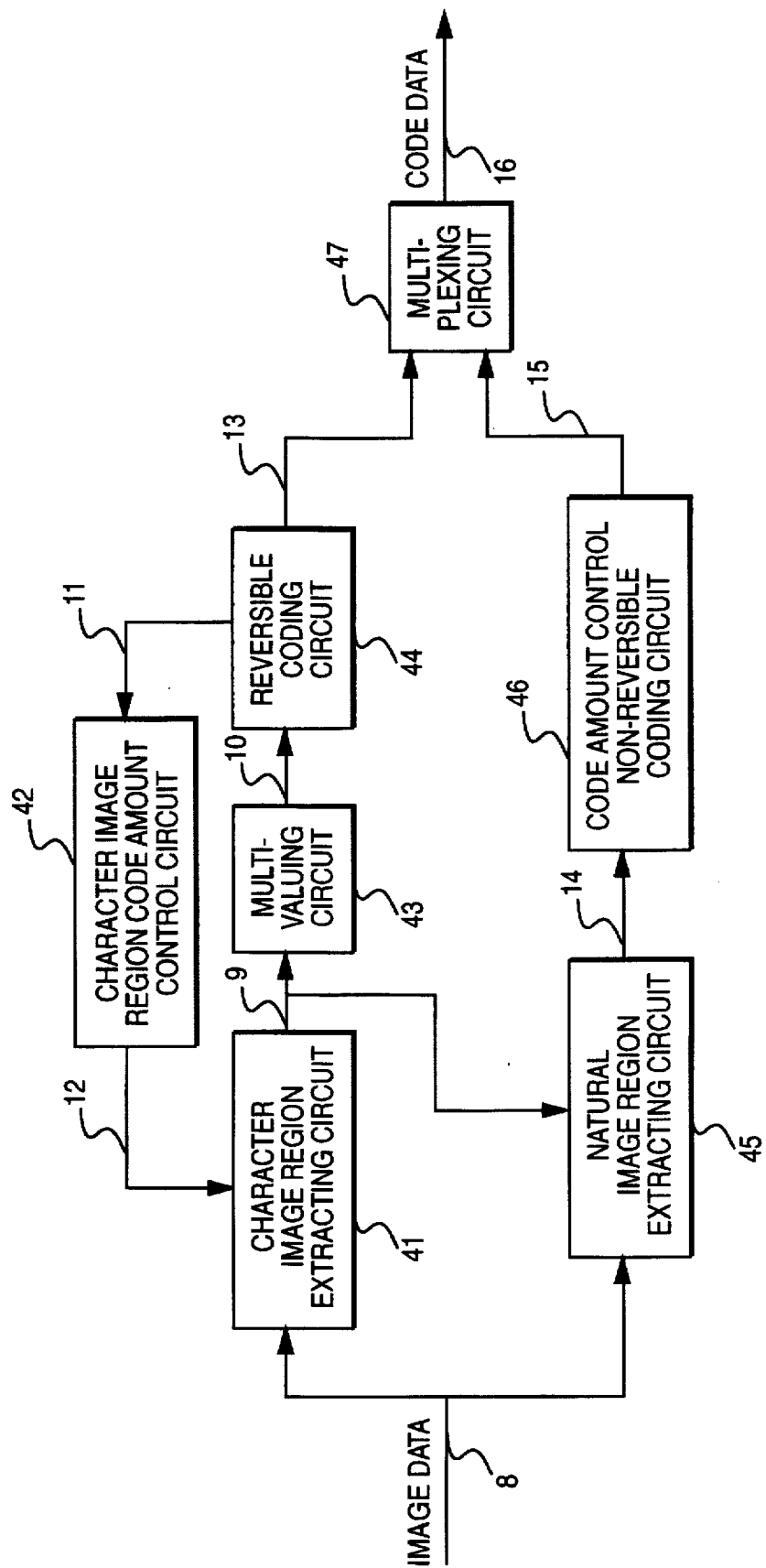
FIG. 4 is a block diagram of a preferred embodiment of the present invention.
Figure 5:
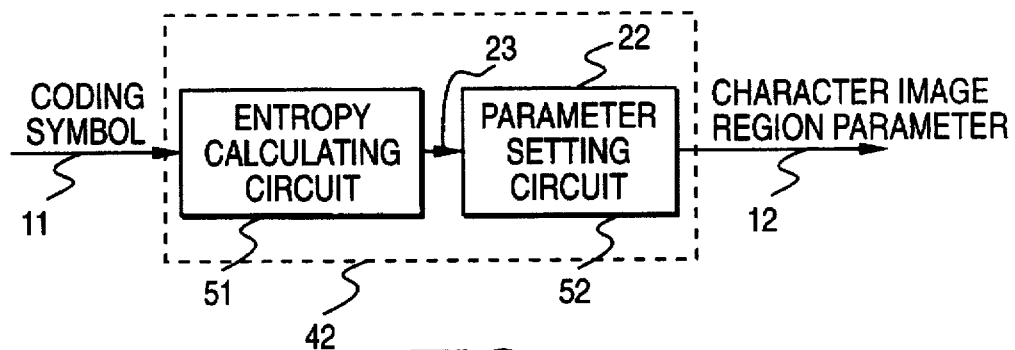
FIG. 5 is a block diagram of a character image region code amount control circuit in the preferred embodiment.
Figure 6:
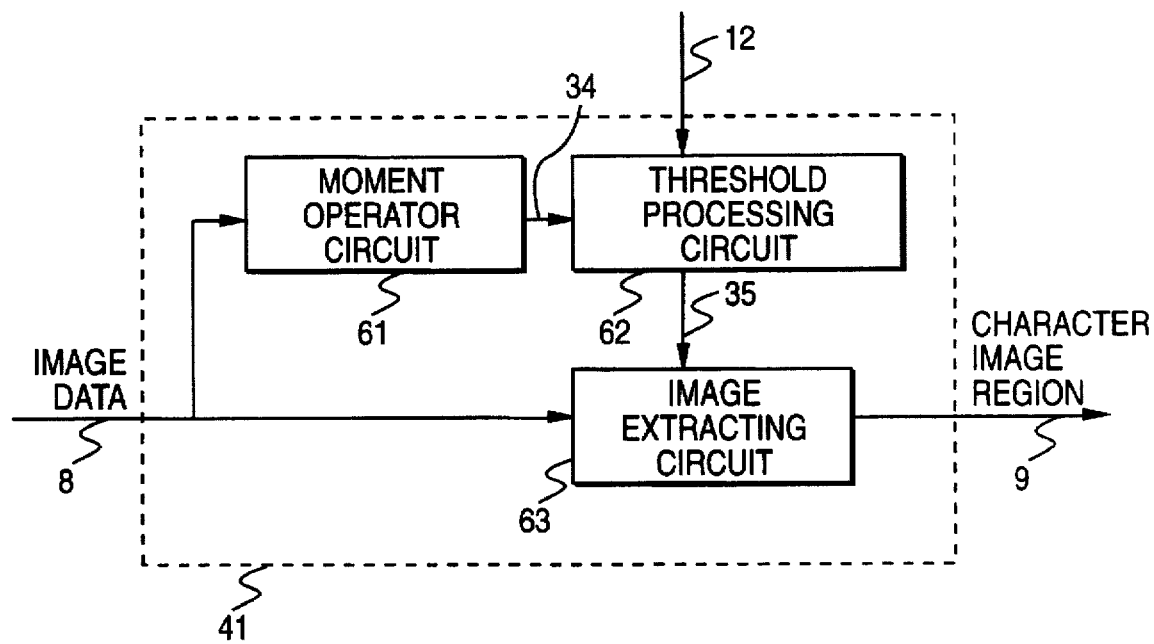
FIG. 6 is a block diagram of a character image region extracting circuit in the preferred embodiment.

The general operation of the preferred embodiment shown in FIGS. 4 to 6 is substantially the same as that of the present invention mentioned above.

The preferred embodiment of the present invention will now be described in more detail with reference to FIGS. 5, 6, and 7A to 7F.

FIG. 6 shows the configuration of a character image region extracting circuit 41 corresponding to the character image region extracting means 1 shown in FIG. 1. The character image region extracting circuit 41 is composed of a moment operator circuit 61 for calculating an intensity of gradient based on moment as the feature amount 34 indicating the intensity of an edge of the image, a threshold processing circuit 62 for performing threshold determination of the feature amount 34 by using the given parameter 12 as a threshold to generate a determination result 35, and an image extracting circuit 63 for extracting the character image region 9 from the input image data 8 according to the determination result 35.

The operation of the character image region extracting circuit 41 will now be described. In the moment operator circuit 61, the intensity of gradient based on moment as described in Takagi et al. ed. "Image Analysis Handbook", Tokyo University Press, pp 550–pp 560 mentioned above is calculated as the feature amount 34 indicating the intensity of an edge of the image. The intensity of gradient based on moment will now be described.

Let P(x, y) denote a pixel value in a two-dimensional coordinate formed by an x-axis and a y-axis. Let (X, Y) denote a center of gravity in a local region about the coordinate (x, y). When an edge of the image is present near the coordinate (x, y), the center of gravity (X, Y) largely deviates from the coordinate (x, y). Then, an intensity G of gradient based on moment can be defined as follows:

$$G=(X-x)^2+(Y-y)^2 \qquad (1)$$

When an intense edge is present near the coordinate (x, y), the value of G is large, whereas when no edge is present near the coordinate (x, y), the value of G is small. Accordingly, it can be said that the value G is a feature amount indicating the intensity of the edge.

In the threshold processing circuit 62, threshold determination of the feature amount 34 is performed by using the given parameter 12 as a threshold T to generate the determination result 35. That is, the feature amount 34 is compared with the threshold 12. When the feature amount 34 is larger than the threshold 12, the result 35 is determined as a character image region, whereas the feature amount 34 is smaller than the threshold 12, the result 35 is determined as a natural image region.

In the image extracting circuit 63, the character image region 9 is extracted from the input image data 8 according to the determination result 35. That is, when the determination result 35 is a character image region, a pixel value of the input image data 8 is output as it stands, whereas when the determination result 35 is a natural image region, a unique pixel value is output instead of the pixel value of the input image data 8. The unique pixel value is a value out of a range that can be taken by the input image data 8, that is, a value out of a dynamic range. For example, when the dynamic range is from 0 to 255, the unique pixel value is set to −1.

Figure 7A:
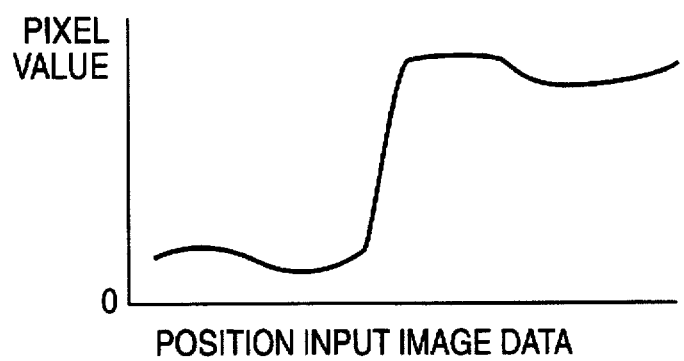
FIGS. 7A to 7F are graphs illustrating the concept of operation in the preferred embodiment.
Figure 7B:
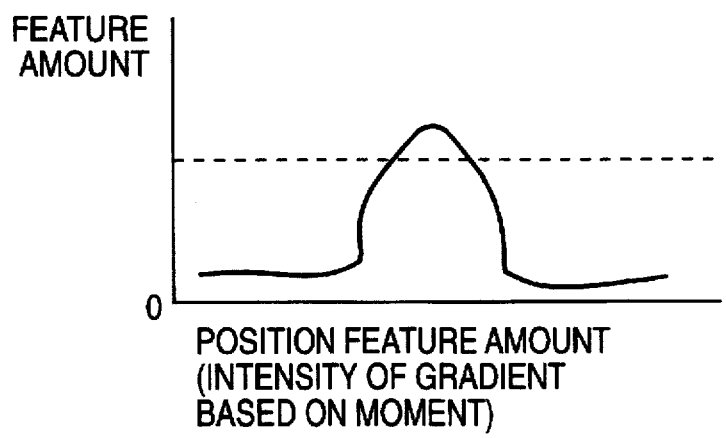
Figure 7C:
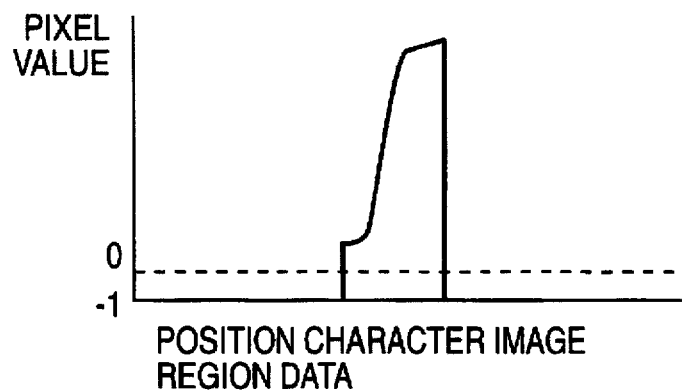

The concept of the operation of the character image region extracting circuit 41 is shown in FIGS. 7A to 7F. FIG. 7A is a graph showing a one-dimensional waveform of the input image data 8, in which a vertical axis represents a pixel value of the input image data 8, and a horizontal axis represents a position in the x-axis or y-axis direction. FIGS. 7B to 7F show various waveforms at the same position as that in FIG. 7A. FIG. 7B is a graph showing a waveform of the intensity G of gradient based on moment and the threshold T. In the periphery of the edge shown in FIG. 7A, the intensity G of gradient shown in FIG. 7B is greater than the threshold T. FIG. 7C shows a waveform of the extracted character image region 9. When the intensity G of gradient is larger than the threshold T, that is, when the character image region is determined, the pixel value of the input image data 8 becomes a pixel value of the character image region. Conversely, when the intensity G of gradient is smaller than the threshold T, the pixel value of the character image region becomes a unique pixel value of −1. Thus, the description of the character image region extracting circuit 41 has been completed.

In this preferred embodiment, the use of the intensity of gradient based on moment as the feature amount of the edge allows detection of the edge without an influence of image noise and irrespective of the direction of the edge.

Further, since the extraction of the character image region per pixel is performed, a character image pasted on a natural image as a background can be extracted.

Additionally, a unique pixel value as information indicating whether the input image data is a character image region or a natural image region is added to the data of the character image region, and the character image region and the natural image region are reversible coded and non-reversible coded, respectively. Accordingly, no special added information for selecting the reversible coding or the non-reversible coding is required, and no special control for the selection of the reversible coding or the non-reversible coding is also required.

Figure 8:
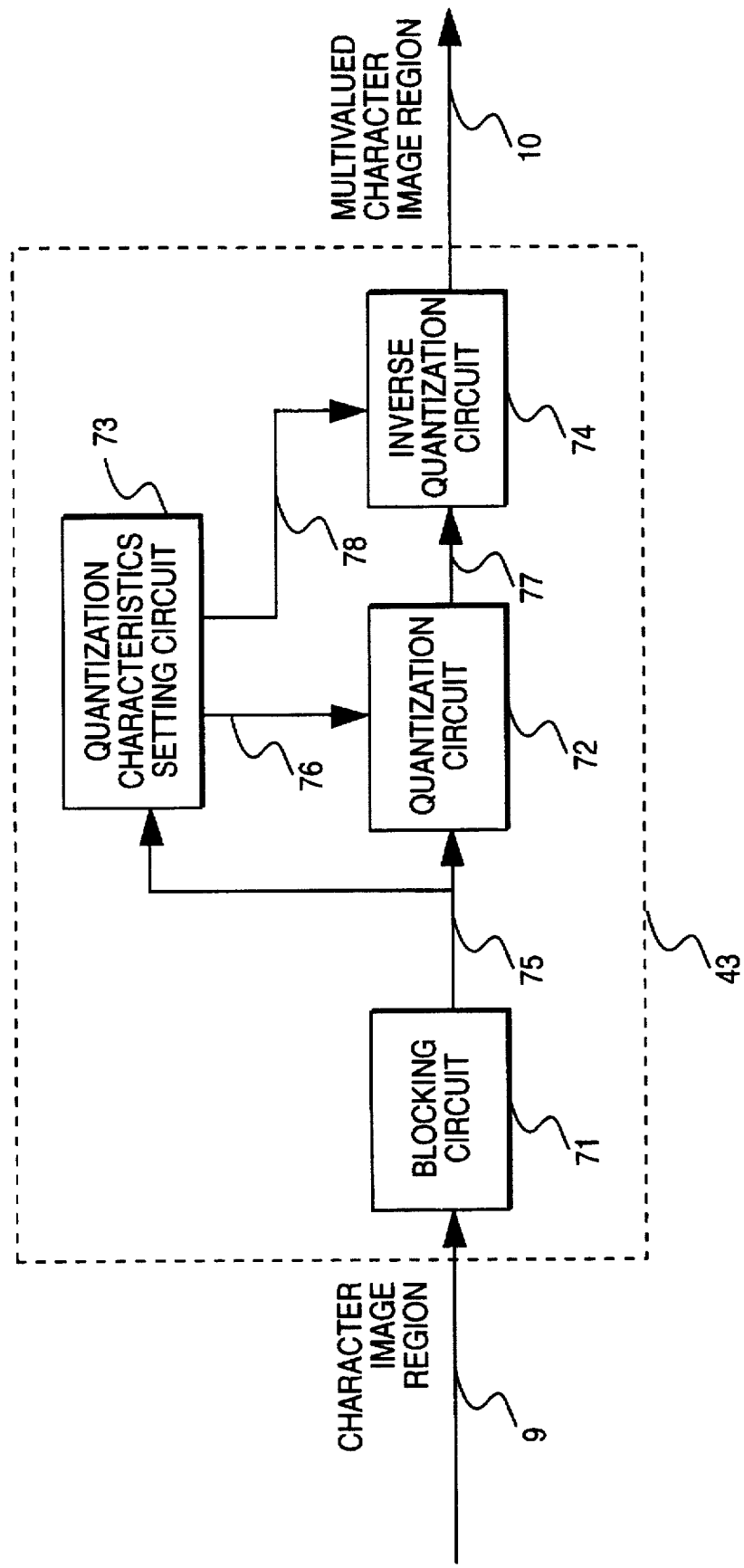
FIG. 8 is a block diagram of a multivaluing circuit in the preferred embodiment.

FIG. 8 shows the configuration of a multivaluing circuit 43 corresponding to the multivaluing means 3 shown in FIG. 1. The multivaluing circuit 43 is composed of a blocking circuit 71 for dividing the character image region 9 into n×m blocks (n, m: positive integers), a quantization characteristics setting circuit 73 for deciding quantization characteristics from a histogram of pixel values of blocked character image regions 75 and generating a quantization threshold 76 and a quantization representative 78, a quantization circuit 72 for performing quantization according to the given quantization threshold 76, and an inverse quantization circuit 74 for performing inverse quantization according to the given quantization representative 78.

The operation of the multivaluing circuit 43 will now be described. In the blocking circuit 71, the character image region 9 is divided into the n×m blocks (n, m: positive integers). In the quantization characteristics setting circuit 73, the quantization characteristics are decided according to the histogram of pixel values of the blocked character image regions 75. At this time, a designing method for a Max type optimum quantizer minimizing a square error is used, for example. This designing method will now be described.

Letting P(x) denote a probability density function of an input x to a quantizer, N denote the number of quantization levels, $x_n$ (n=0, 1, 2, ..., N) represent the quantization threshold, and $y_n$ (n=1, 2, ..., N) represent the quantization representative, the quantization characteristics are given by Eq. (2).

When $x_{n-1} \leq x < x_n$, $$y = y_n \ (n=1, 2, \ldots, N) \tag{2}$$

If Eq. (2) gives optimum quantization minimizing average quantization noise power, Eqs. (3) and (4) hold.

$$x_n = (y_n + y_{n+1})/2 \ (n = 1, 2, \ldots, N) \tag{3}$$

$$y_n = \left\{ \int_{x_{n-1}}^{x_n} xP(x)dx \right\} / \left\{ \int_{x_{n-1}}^{x_n} p(x)dx \right\} \ (n = 1, 2, \ldots, N) \tag{4}$$

Accordingly, by defining the quantization threshold $x_n$ (n=0, 1, 2, ..., N) and the quantization representative $y_n$ (n=1, 2, 3, ..., N) by the use of Eqs. (3) and (4), the optimum quantization characteristics minimizing the average quantization noise error can be obtained. Thus, the description of the designing method has been completed.

That is, in the quantization characteristics setting circuit 73, the Max type optimum quantizer is designed on the assumption that the histogram of pixel values of the blocked character image regions 75 is a probability density function P(x) to obtain the quantization threshold 76 or $x_n$ (n=0, 1, 2, ..., N) and the quantization representative 78 or $y_n$ (n=1, 2, 3, ..., N).

In the quantization circuit 72, the quantization is performed according to the given quantization threshold 76 to generate a quantization index 77. Letting I denote the quantization index, the quantization is given by Eq. (5).

When $x_{n-1} \leq x < x_n$, $$I = n \ (n=1, 2, \ldots, N) \tag{5}$$

In the inverse quantization circuit 74, the inverse quantization is performed according to the given quantization representative 78 to generate a multivalued character image region 10. The inverse quantization is given by Eq. (6).

When I=n, $$y = y_n \ (n=1, 2, \ldots, N) \tag{6}$$

In counting the histogram of pixel values of the blocked character image regions 75, the unique pixel value indicating pixels in the region determined as a natural image region is removed.

Figure 7D:
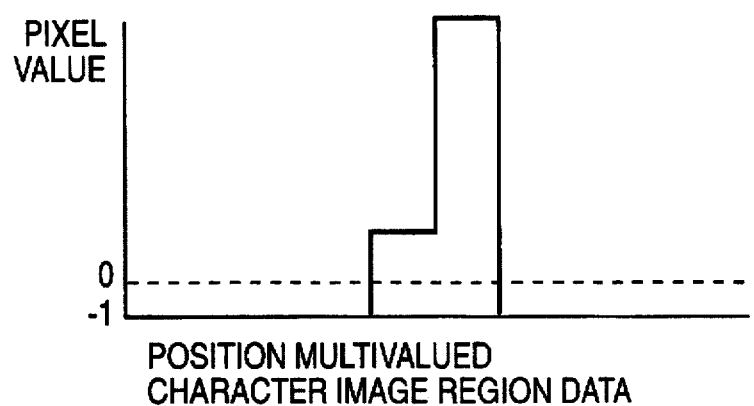

The concept of the operation of the multivaluing circuit 43 will now be described with reference to FIGS. 7A to 7F. FIG. 7C shows a waveform of the pixel values of the blocked character image regions 75. The histogram of pixel values other than the unique pixel value, that is, the histogram of pixel values of pixels in the region determined as a character image region is counted, and the Max type optimum quantization is performed according to the histogram, with the result that the waveform shown in FIG. 7D is obtained. In the example shown in FIG. 7D, the number of quantization levels is 2. The unique pixel value is retained as it stands throughout the multivaluing process. Thus, the description of the operation of the multivaluing circuit 43 has been completed.

In this preferred embodiment, the multivaluing circuit 43 is formed by the Max type optimum quantizer, thereby allowing general-purpose multivaluing not depending upon an image. Alternatively, the multivaluing circuit 43 may be formed by a linear quantizer, for example.

Figure 14:
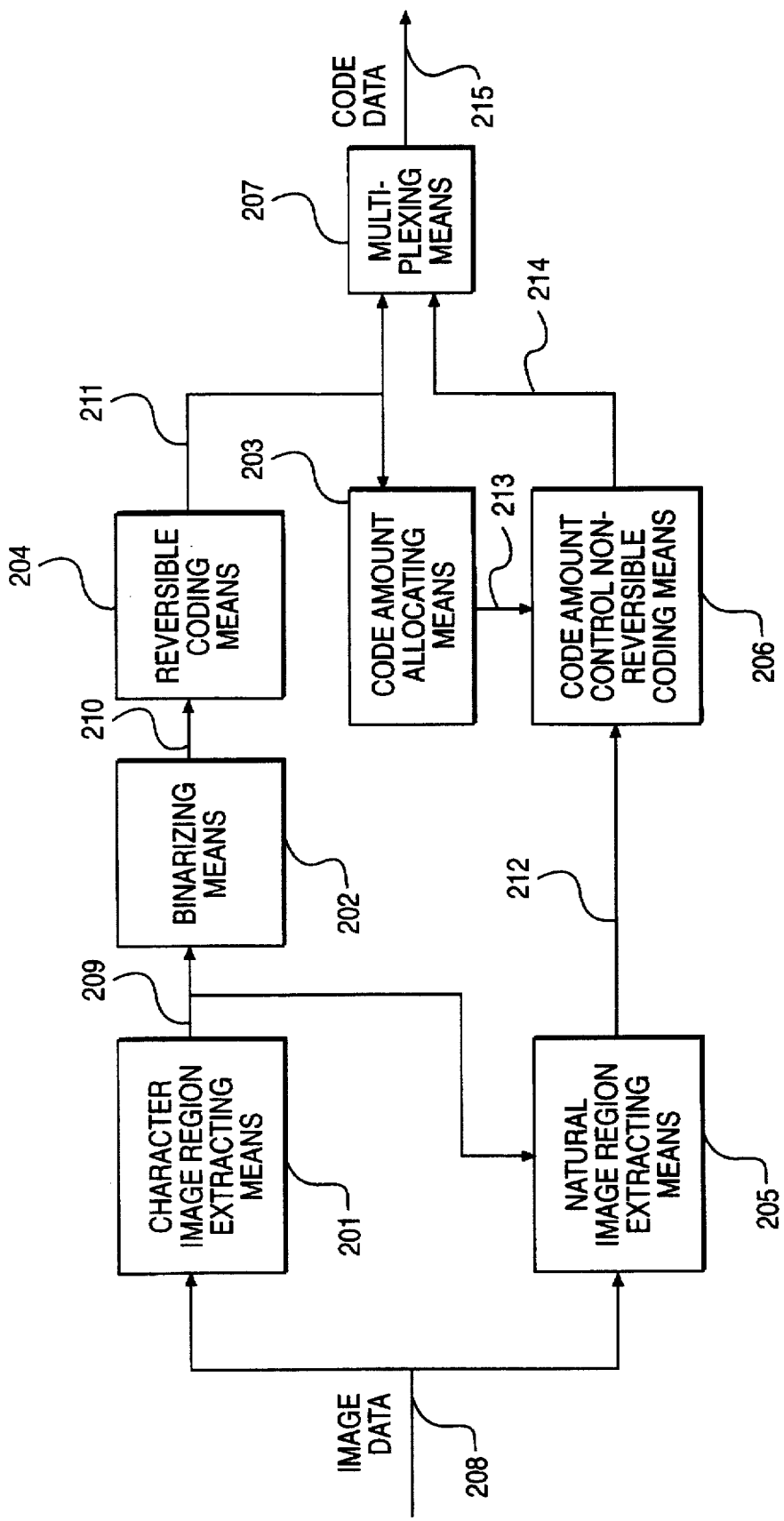
FIG. 14 is a block diagram of code amount control for hybrid coding in the related art.

In this preferred embodiment, a character image region is multivalued rather than binarized as in the related art shown in FIG. 14. Accordingly, efficient coding can be performed also to a character image having two or more colors, e.g., a three-color image with a color character such as a character having an alternate red and blue stripe on a yellow background.

Figure 9:
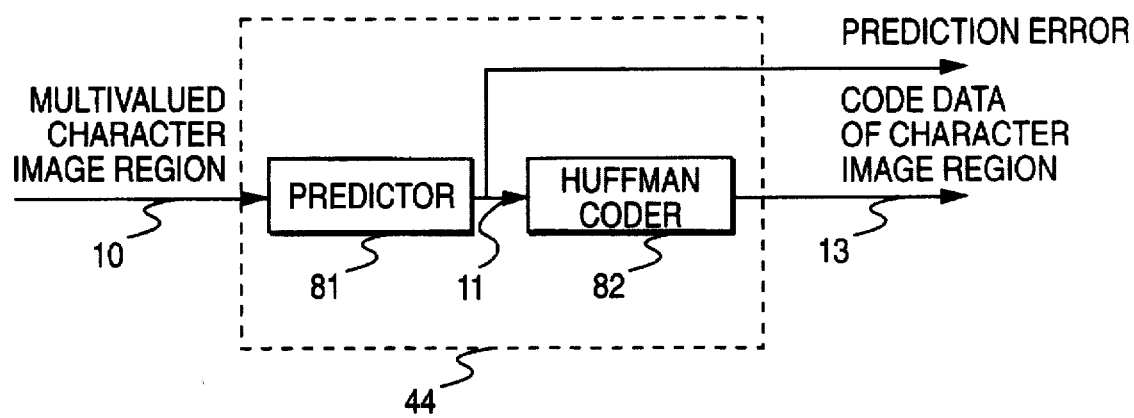
FIG. 9 is a block diagram of a reversible coding circuit in the preferred embodiment.

FIG. 9 shows the configuration of a reversible coding circuit 44 corresponding to the reversible coding means 4 shown in FIG. 1. The reversible coding circuit 44 is composed of a predictor 81 for inputting the multivalued character image region 10 and outputting the coding symbol or prediction error 11, and a Huffman coder 82 for Huffman coding the prediction error 11 to generate the code data 13 of the character image region.

The operation of the reversible coding circuit 44 will now be described. In the predictor 81, the pixel value of a subject pixel in the multivalued character image region 10 is predicted from the pixel values of peripheral pixels having already been predicted, and a difference between a predicted pixel value and an actual pixel value of the subject pixel is output as the prediction error 11. For example, in the order of scanning of pixels, the pixel value of a pixel immediately prior to the subject pixel is used as the predicted pixel value. At this time, the unique pixel value indicative of a natural image region determined is also predicted as similar to the pixels in the character image region determined.

When the final multivalued character image region 10 after completion of the code amount control of the character image region is input, the prediction error 11 is Huffman coded in the Huffman coder 82 to generate the code data 13 of the character image region.

Until the code amount control of the character image region is completed, the coding symbol or the prediction error 11 is fed to a character image region code amount control circuit 42 which will be hereinafter described. At this time, the prediction error 11 need not be Huffman coded. Thus, the description of the operation of the reversible coding circuit 44 has been completed.

FIG. 5 shows the configuration of the character image region code amount control circuit 42 corresponding to the character image region code amount control means 2 shown in FIG. 1. The character image region code amount control circuit 42 is composed of an entropy calculating circuit 51 for calculating the entropy of the prediction error 11 to generate the estimated code amount 23, and a parameter setting circuit 52 for setting the parameter according to the estimated code amount 23, that is, the threshold 12 of the intensity of gradient based on moment so that the code amount of the character image region becomes the preset target code amount.

The operation of the character image region code amount control circuit 42 will now be described. In the entropy calculating circuit 51, the entropy of the prediction error 11 is calculated. Letting $P(S_i)$ denote an occurrence probability of the prediction error $S_i$ ($i=0, 1, \ldots, M-1$), the entropy H is given by Eq. (7).

$$H = -P(S_i) \sum_{i=0}^{M-1} \log_2 P(S_i) \tag{7}$$

In this case, it is assumed that there occur M kinds of values of the prediction error. For example, when the dynamic range of the input image data is 0 to 255 and the unique pixel value is −1, the prediction error may take 513 kinds of values ranging from −256 to 256. If ideal coding is performed, the code amount is equal to the value of the entropy. However, in the actual Huffman coder 82, the code amount becomes larger than the value of the entropy. The actual code amount is approximately proportional to the entropy. Then, the estimated code amount 23 or Z is obtained by Eq. (8).

$$Z=aH+b \tag{8}$$

where a and b represent experimental values.

In the parameter setting circuit 52, the parameter or the threshold 12 of the intensity of gradient based on moment is set according to the estimated code amount 23 so that the code amount of the character image region becomes the preset target code amount. At this time, a recursive computational method such as a Newton-Raphson method is used. That is, on the assumption that the estimated code amount Z is a function of the threshold T of the intensity of gradient, a change in the estimated code amount Z with a change in the threshold T is examined, and the threshold T at which the estimated code amount Z becomes the target code amount is predicted from the relation between the estimated code amount Z and the threshold T. Until the predicted value becomes the target code amount, this processing is repeated. In general, the estimated code amount Z monotonously decreases with respect to the threshold T, and the threshold T at which the estimated code amount Z becomes the target code amount can therefore be necessarily obtained.

At the time when the threshold T providing the target code amount is obtained, the character image region code amount control circuit 42 stops the operation to output the final parameter 12. Thereafter, the final character image region 9 is extracted in the character image region extracting circuit 41, and is then multivalued in the multivaluing circuit 43. Then, the final multivalued character image region 10 is reversible coded in the reversible coding circuit 44 to generate the code data 13.

In this preferred embodiment, the entropy of the coding symbol is used to estimate the code amount. Accordingly, even when the entropy coding is general-purpose coding such as arithmetic coding that follows a statistic property of input symbols, the code amount can be estimated.

In case the entropy coding is fixedly performed according to a preset Huffman code table, the code lengths of Huffman code words corresponding to the coding symbols may be accumulated rather than counting the entropy of the coding symbols.

Figure 10:
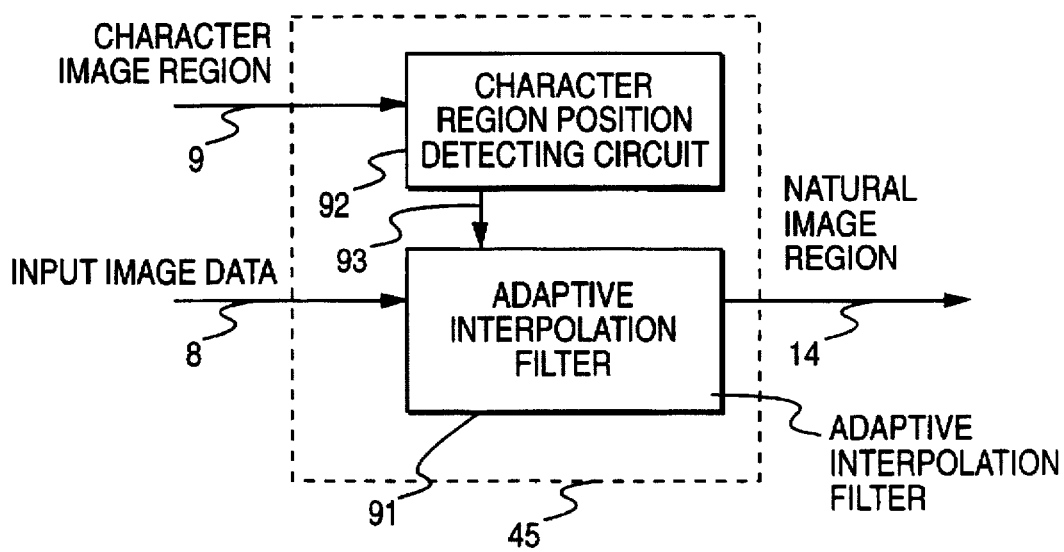
FIG. 10 is a block diagram of a natural image region extracting circuit in the preferred embodiment.

FIG. 10 shows the configuration of a natural image region extracting circuit 45 corresponding to the natural image region extracting means 5 shown in FIG. 1. The natural image region extracting circuit 45 is composed of a character region position detecting circuit 92 for detecting a position of the pixel in the character image region determined to generate a determination result 93 indicating whether the input region is a character image region or a natural image region, and an adaptive interpolation filter 91 for extracting the natural image region 14 from the input image data 8 according to the determination result 93.

The operation of the natural image region extracting circuit 45 will now be described. In the character region position detecting circuit 92, it is determined whether or not the pixel value in the multivalued character image region 9 is the unique pixel value to generate the determination result 93. That is, if the pixel value is the unique pixel value, the multivalued character image region 9 is determined as a natural image region, whereas if the pixel value is not the unique pixel value, the multivalued character image region 9 is determined as a character image region. In the adaptive interpolation filter 91, the natural image region 14 is extracted from the input image data 8 according to the determination result 93. The pixel value of the pixel in the natural image region determined is output as it stands, whereas the pixel value of the pixel in the character image region determined is replaced by a value obtained by interpolation between the pixel in the character image region determined and it peripheral pixel in the natural image region determined. For example, letting V(x, y) denote a pixel value in a two-dimensional coordinate (x, y), W(x, y) denote an input to the interpolation filter, and U(x, y) denote an output from the interpolation filter, the interpolation is represented by Eq. (9).

$$U(x,y) = \sum_{i=x-k}^{x+k} \sum_{j=y-k}^{y+k} (i,j)W(i,j) \tag{9}$$

where:

when (x, y) is a character image region, W(x, y)=0; and when (x, y) is a natural image region, $$W(x, y)=V(x, y) \tag{10}$$

In Eq. (9), a(i, j) represents a filter coefficient, which decides interpolation characteristics, and k represents a constant corresponding to the number of taps of the interpolation filter. For example, when k=1, the interpolation is performed by using the values of eight pixels located around the subject pixel.

Figure 7E:
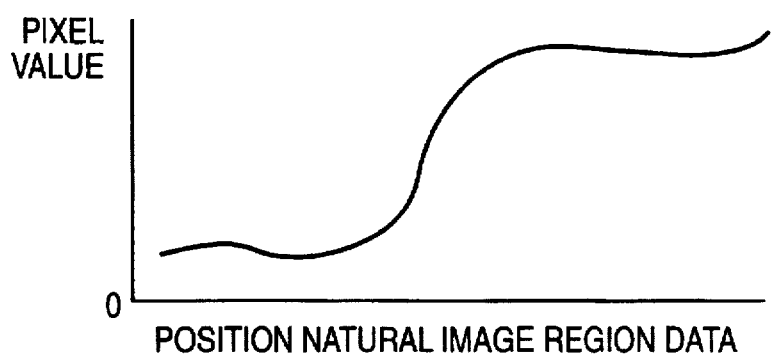

The concept of the operation of the natural image region extracting circuit 45 will now be described with reference to FIGS. 7A to 7F. FIG. 7E shows the natural image region extracted from the input image shown in FIG. 7A. As shown in FIG. 7E, the edge determined as the character image region has been removed, and it is replaced by a gentle slope obtained by the interpolation from the peripheral pixels around the edge. Thus, the description of the operation of the natural image region extracting circuit 45 has been completed.

In this preferred embodiment, when extracting a natural image, the value of the pixel in the character image region determined is replaced by the value obtained by the interpolation from the values of the peripheral pixels in the natural image region determined. Accordingly, in the non-reversible coding of the natural image region, an undue code amount is not allocated to the pixel in the character image region determined. In the DCT coding, a large code amount is allocated to an intense edge if present. Further, a quantization error of a high spatial frequency component included in the edge causes a coding noise such as a mosquito noise in the natural image region in the periphery of the edge. According to this preferred embodiment, however, such disadvantages can be eliminated.

Figure 11:
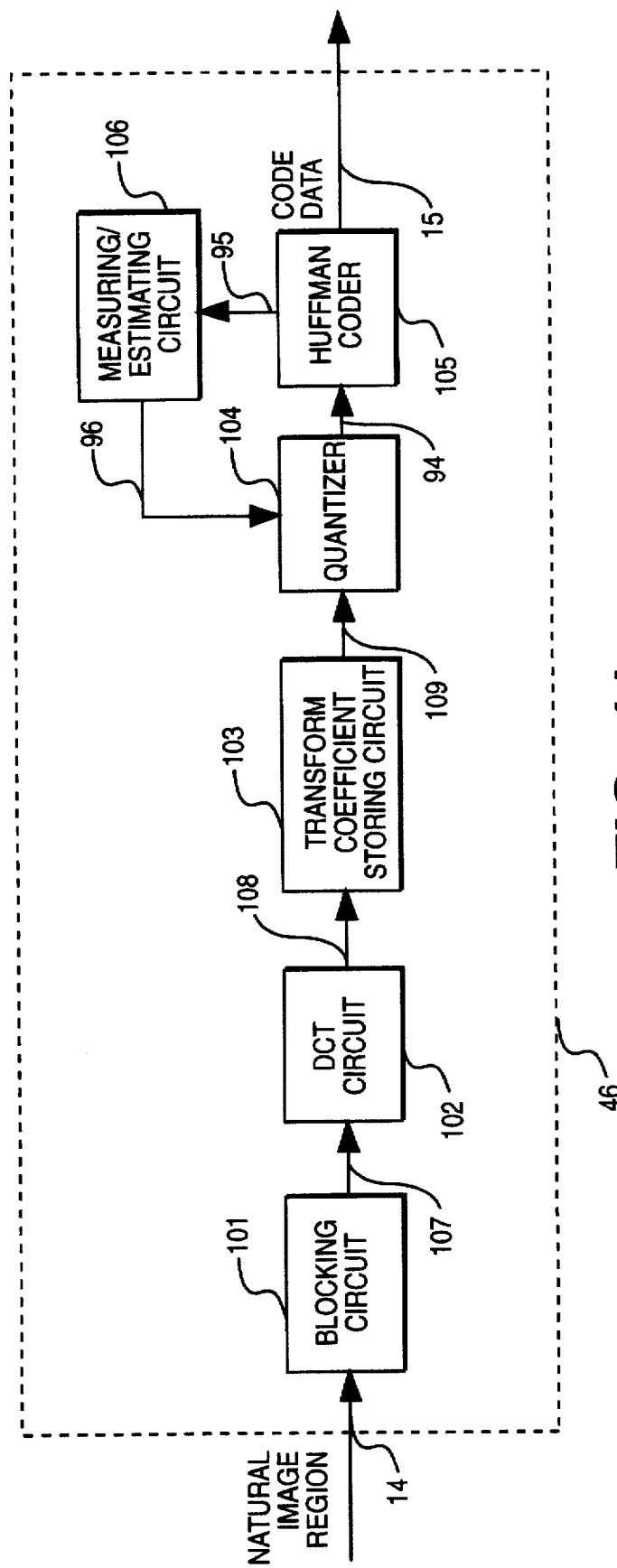
FIG. 11 is a block diagram of a code amount control non-reversible coding circuit in the preferred embodiment.

FIG. 11 shows the configuration of a code amount control non-reversible coding circuit 46 corresponding to the code amount control non-reversible coding means 6 shown in FIG. 1. Each circuit shown in FIG. 11 and each means shown in FIG. 13 are in one-to-one correspondence.

Figure 13:
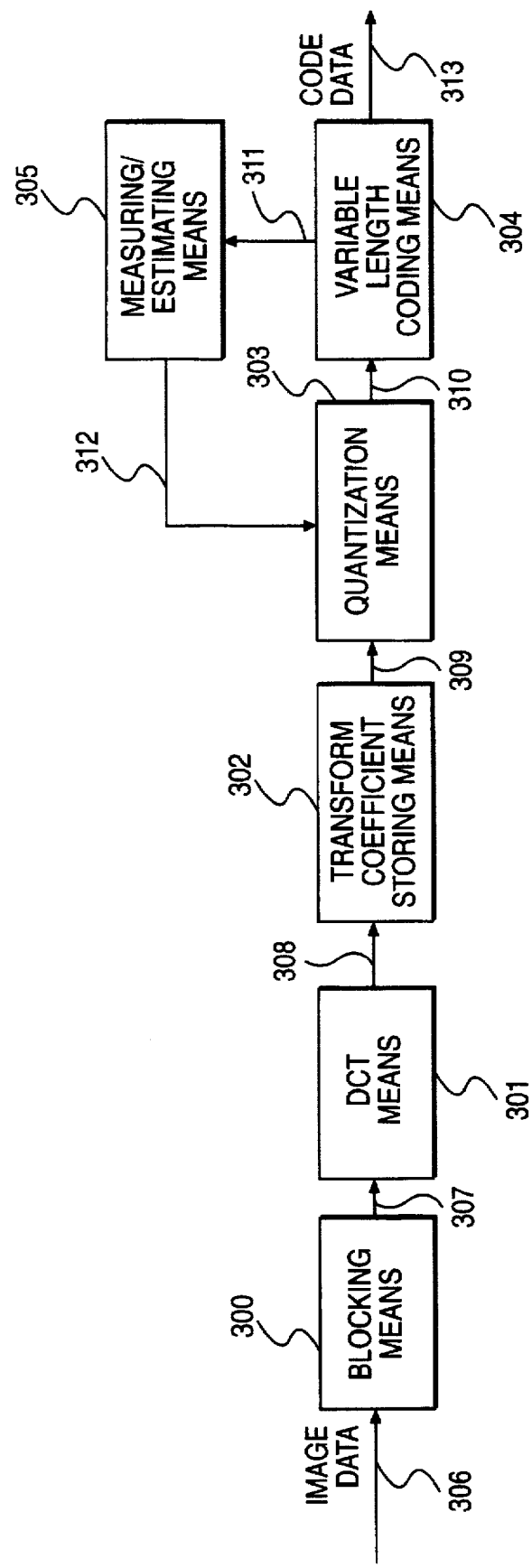
FIG. 13 is a block diagram of a code amount control DCT system in the related art.

The operation of the code amount control non-reversible coding circuit 46 is similar to that of the circuit shown in FIG. 13, and the description thereof will therefore be omitted herein.

Figure 12:
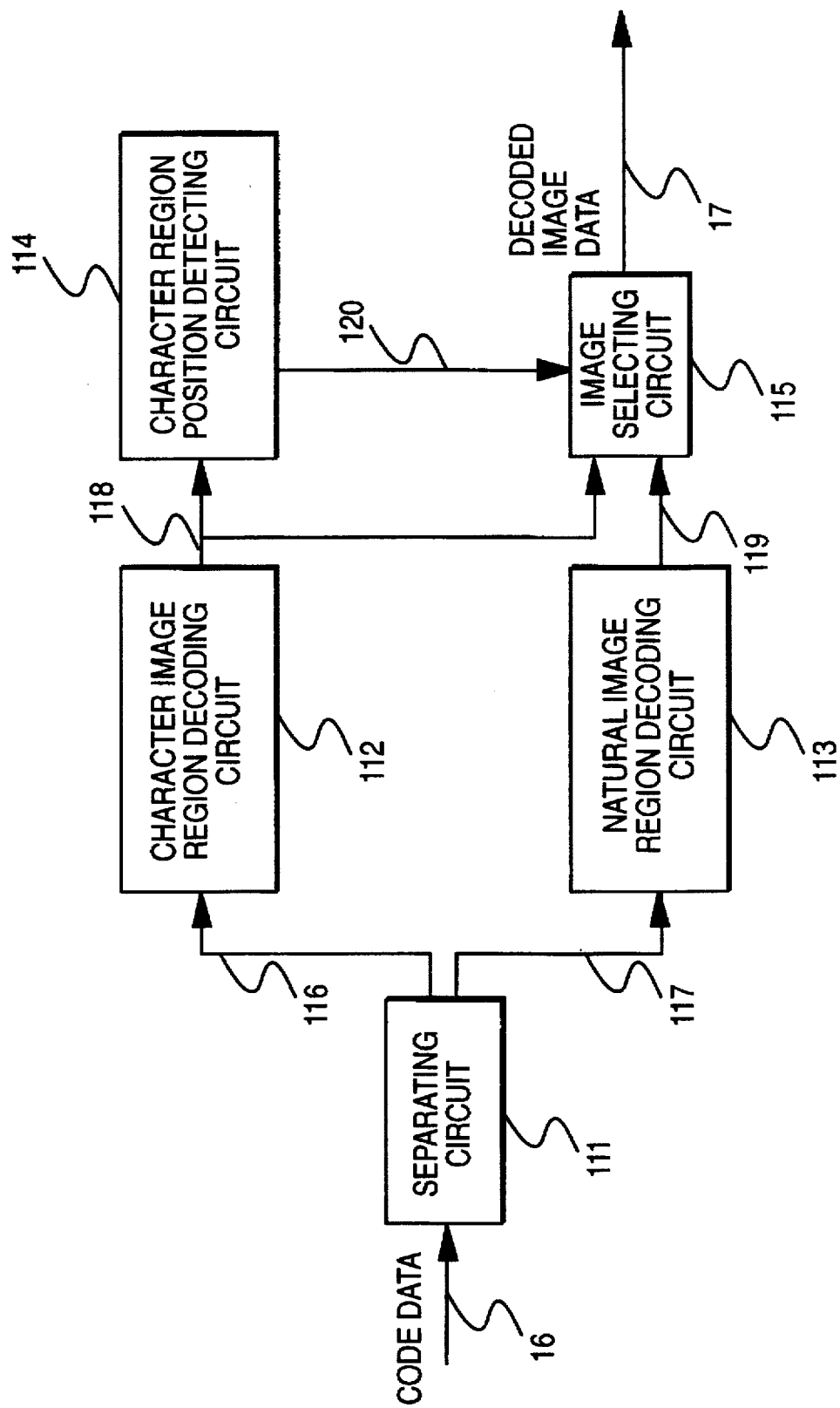
FIG. 12 is a block diagram of a decoding circuit in the preferred embodiment.

FIG. 12 shows the configuration of a decoding circuit for decoding the code data 16 obtained by the coding circuit shown in FIG. 4.

The decoding circuit is composed of a separating circuit 111 for separating the code data 16 into code data 116 of a character image region and code data 117 of a natural image region, a character image region decoding circuit 112 for decoding the code data 116 to generate a decoded character image region 118, a natural image region decoding circuit 113 for decoding the code data 117 to generate a decoded natural image region 119, a character region position detecting circuit 114 for detecting whether or not the pixel in the decoded character image region 118 is the pixel in the character image region determined to generate a determination result 120, and an image selecting circuit 115 for selecting either the decoded character image region 118 or the decoded character image region 119 according to the determination result 120.

The operation of the decoding circuit will now be described. In the separating circuit 111, the code data 16 is separated into the code data 116 of the character image region and the code data 117 of the natural image region. In the character image region decoding circuit 112, the code data 116 is decoded to obtain the character image region 118. In the natural image region decoding circuit 113, the code data 117 is decoded to obtain the natural image region 119. In the character region position detecting circuit 114, it is determined whether or not the pixel value in the decoded character image region 118 is the unique pixel value to thereby determine whether or not the pixel in the decoded character image region 118 is the pixel in the character image region determined, then generating the determination result 120. In the image selecting circuit 115, either the decoded character image region 118 or the decoded natural image region 119 is selected according to the determination result 120, then generating a selection result as decoded image data 17.

Figure 7F:

The concept of the operation of the decoding circuit will now be described with reference to FIGS. 7A to 7F. FIG. 7F shows a waveform of the decoded image. As shown in FIG. 7F, a gentle waveform approximate to the waveform of the input image data 8 is reproduced for the pixels determined as the character image region, and a multivalued (binarized in this case) edge is reproduced for the pixels determined as the natural image region.

While the invention has been described with reference to specific embodiments, the description is illustrative and is not to be construed as limiting the scope of the invention. Various modifications and changes may occur to those skilled in the art without departing from the spirit and scope of the invention as defined by the appended claims.

What is claimed is:

1. An image coding device comprising:

first means for extracting a character image region having a variable size from input image data;

second means for controlling the size of the character image region to be extracted by said first means, so that the code amount of said image data of the character image region is to be equal to a first preset target code amount;

third means for multivaluing image data of said character image region extracted by said first means;

fourth means for reversible coding image data of said character image region multivalued by said third means;

fifth means for subtracting said image data of said character image region from said input image data to generate image data of a non-character image region; and sixth means for non-reversible coding said image data of said non-character image region generated from said fifth means, a code data amount of said image data of said non-character image region being equal to a second preset target code amount.

2. An image coding device according to claim 1, wherein said second means comprises:

means for measuring entropy of a coding symbol generated from said fourth means and estimating a code amount as a function of said entropy; and means for setting a parameter for varying said size of said character image region;

wherein when said estimated code amount is larger than said first preset target code amount, said parameter is set so that said size of said character image region to be extracted becomes small, whereas when said estimated code amount is smaller than said first preset target code amount, said parameter is set so that said size of said character image region to be extracted becomes large.

3. An image coding device according to claim 1, wherein said first means comprises:

means for calculating a feature amount of an input image;

means for determining said character image region according to a criterion of said feature amount; and means for extracting said character image region according to a result of determination;

wherein said size of said character image region to be extracted is varied by varying said criterion.

4. An image coding device according to claim 3, wherein said feature amount of said input image comprises an intensity of gradient based on moment, said intensity representing a feature amount corresponding to an intensity of an edge.

* * * * *

UNITED STATES PATENT AND TRADEMARK OFFICE
CERTIFICATE OF CORRECTION

PATENT NO. : 5,701,367
DATED : December 23, 1997
INVENTOR(S) : Yutaka KOSHI et al.

It is certified that error appears in the above-indentified patent and that said Letters Patent is hereby corrected as shown below:

Title page, item [73], in the Assignee, "LTD." should read --Ltd.--.

Signed and Sealed this

Thirtieth Day of June, 1998

Attest:

BRUCE LEHMAN

Attesting Officer

Commissioner of Patents and Trademarks